United States Patent [19]

Sawada et al.

[11] Patent Number: 4,843,569
[45] Date of Patent: Jun. 27, 1989

[54] DATA INPUT APPARATUS FOR PICTURE DATA BASE MANAGEMENT SYSTEM

[75] Inventors: Nobuo Sawada, Atsugi; Hiroko Asai, Hamamatsu, both of Japan

[73] Assignee: Kabushiki Kaisha Toshiba, Kawasaki, Japan

[21] Appl. No.: 99,596

[22] Filed: Sep. 22, 1987

[30] Foreign Application Priority Data

Sep. 25, 1986 [JP] Japan .............................. 61-226745

[51] Int. Cl.$^4$ .............................................. G06F 3/00
[52] U.S. Cl. .................... 364/518; 340/745; 340/747
[58] Field of Search ............. 364/518, 424, 443, 521; 340/747, 730, 745; 382/56

[56] References Cited

U.S. PATENT DOCUMENTS

| | | | |
|---|---|---|---|
| 4,570,227 | 2/1986 | Tachi et al. | 364/444 |
| 4,589,144 | 5/1986 | Namba | 382/61 |
| 4,646,089 | 2/1987 | Takanabe et al. | 340/995 |
| 4,660,037 | 4/1987 | Nakamura | 340/990 |
| 4,716,404 | 12/1987 | Tabata et al. | 340/723 |
| 4,737,916 | 4/1988 | Ogawa et al. | 364/443 |
| 4,740,904 | 4/1988 | Naggle | 364/520 |

OTHER PUBLICATIONS

Phillips R. L., "Computer Graphics in Urban and Environmental Systems" Proceedings of IEEE, 4/1974 pp. 405-420.
Huertas et al., "Detecting Buildings in Aerial Images" Computer, Vision, Graphics and Image Processing 41, 1988, pp. 131-152.
Frei et al., "Fast Boundary Detection: A Generalization and a New Algorithm" IEEE Trans. on Computers 10/77 pp. 988-998.
"Digital Picture Processing", pp. 317-328; A. Rosenfeld & A. C. Kak, 1976.

Primary Examiner—Gary V. Harkcom
Assistant Examiner—Phu K. Nguyen
Attorney, Agent, or Firm—Oblon, Spivak, McClelland, Maier & Neustadt

[57] ABSTRACT

An input apparatus for a computer-aided picture data base management system, which has an image input device that optically reads an original picture image, such as a map having objects drawn by closed loop lines, and produces its digital image. An object image pattern extracting unit executes a digital image processing to extract map objects from the image and produces vector data of a series of coordinate data streams that define the geometric shape of each extracted object. The vector data of the extracted objects are automatically affixed with identification labels. An image presentation device outputs a reference image including the extracted objects affixed with the identification labels and presents it to an operator. When the operator manually prepares a document describing the list of plural sets of attribute data to be input, which are also affixed with identification labels, by referring to the reference image and sets the document to an optical character reader, which produces a character data signal that represents plural sets of attribute data corresponding to the extracted objects. This signal is supplied to an automatic map data generator, which automatically combines plural sets of vector data of the extracted objects with plural sets of attribute data through the identification labels in such a manner that one set of attribute data is merged with vector data having the same identification label as this attribute data.

14 Claims, 4 Drawing Sheets

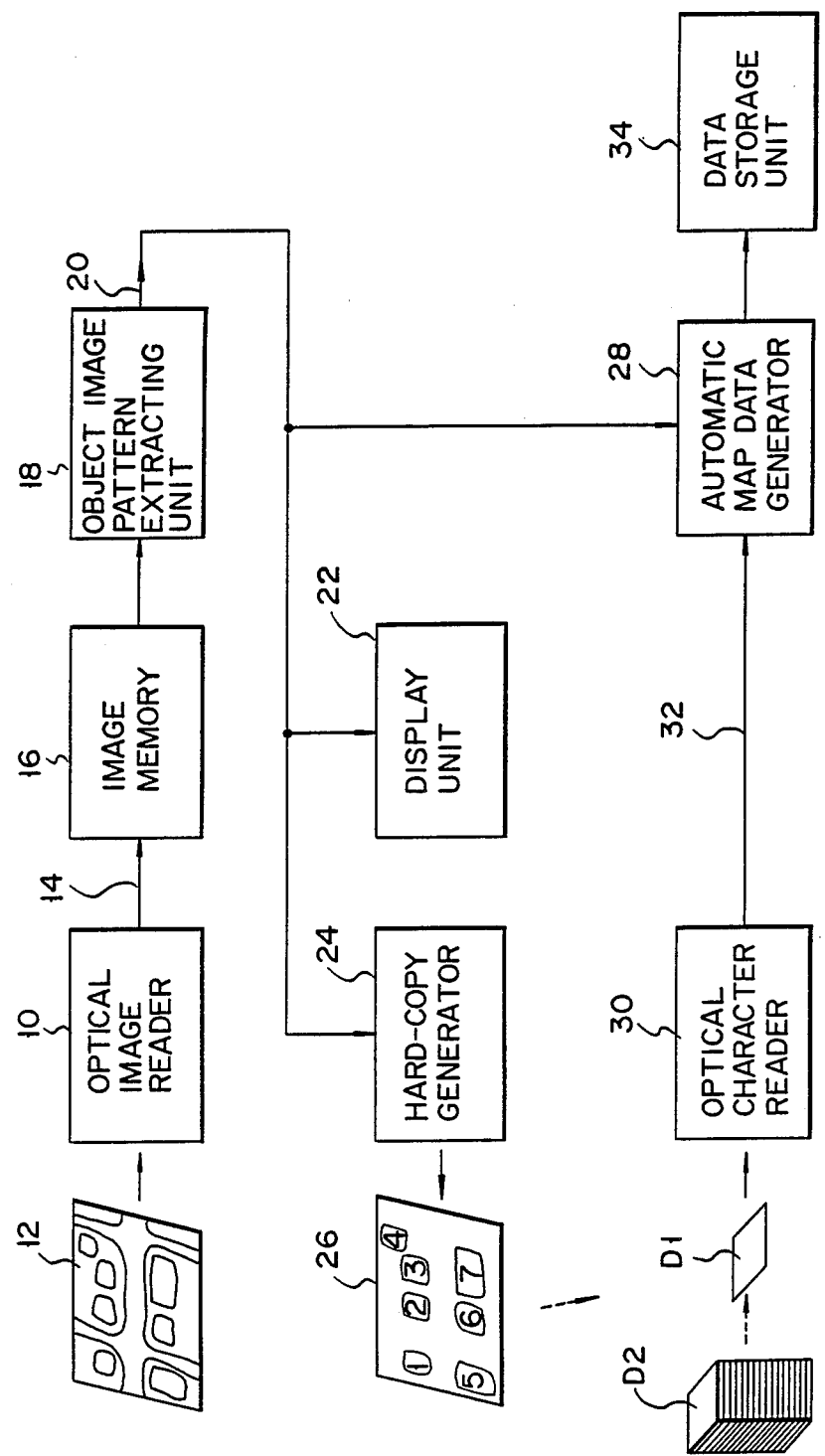
F I G. 1

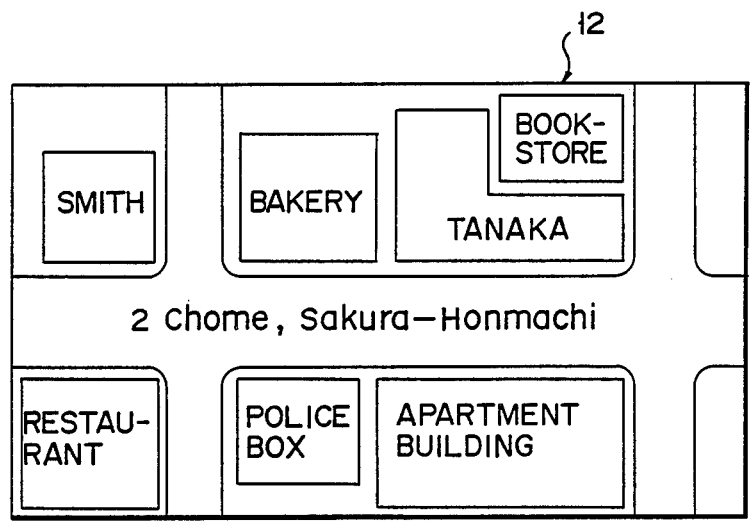
F I G. 2
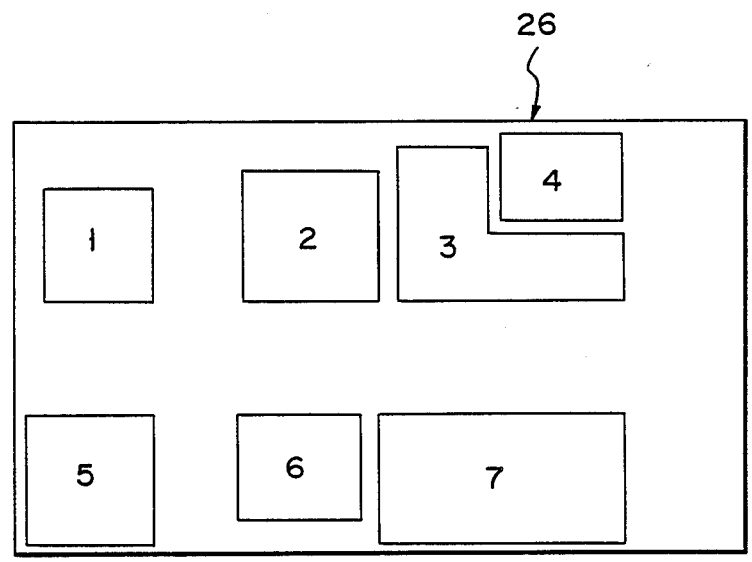
F I G. 3

DATA INPUT APPARATUS FOR PICTURE DATA BASE MANAGEMENT SYSTEM

BACKGROUND OF THE INVENTION

The present invention relates to a digital image processing system and, more particularly, to a data input apparatus for a computer-aided picture data base management system that deals with a data base of picture information such as map information or drawing information.

Recently, development of computer-aided graphic data base management systems is in progress, which have picture information, such as map or drawing information, built directly into a data base (known as "picture data base" or "graphic data base" among those skilled in the art) and retrieve graphic information as requested by a operator. For instance, according to a picture data base management system that deals with map information (such is called a "geographic mapping system"), the background image of a map, namely, the one showing blocks in a local area separated by streets, avenues and the like, is entirely converted into digital image information and is stored in an internal data storage unit. A desired regional image is displayed on a display unit. Pictures or object images, such as houses, parks and establishments or facilities, are added to the background image so as to complete a practical map image.

To view a desired particular region of the databased city map or street map on the display screen, when a desired region is designated in accordance with predetermined procedures, a computer automatically retrieves the picture data base in the data storage unit and displays on the display unit the map for the desired region including objects that are indicated by geometric patterns corresponding to the actual plan view of houses, etc. Each object is written with attribute data that consists of characters or a symbol representing the object's attribute information, such as a house owner, an address or a telephone number. The background image, which is separated into blocks by avenues, streets, back roads and alleys, is written with attribute data that consists of characters or symbols representing the image's attribute information, such as block numbers and street names. Therefore, the operator can easily attain the necessary attribute information through the display regional map information.

In the case where map data base is input to a conventional computer-aided geographic mapping system, the geometric background image information of a map is read by an optical image reader and is then input to the system as digitized image information. The attribute data such as house owners, addresses, telephone numbers, block numbers and street names are manually entered by the operator using a conventional keyboard unit. At the time of entering the attribute data, the operator first displays the background image on the display screen, designates the aimed object (e.g., a house) in the displayed image using a known pointing device, such as a mouse device, and enters characters or symbol data at the designated position of the displayed image using the keyboard. This input operation is done on a vast amount of attribute data over a wide range of the map and depends considerably on the efficiency of the operator's manual work. The attribute data to be input are manually prepared by referring to a topographic map that has been prepared in advance, and what is more, each target position on the map 4 image needs to be designated by the pointing device. Therefore, the input operation of the map image data base is considerably troublesome and time-consuming.

SUMMARY OF THE INVENTION

With the above situation in mind, therefore, it is an object of this invention to provide a novel and improved input apparatus for a computer-aided picture data base management system, which can improve efficiency of the operation to input the attribute data accompanying picture information.

In accordance with the above object, the present invention is addressed to a specific picture data base input apparatus equipped with an image input device which optically reads an original picture image and produces its digital picture image. The original picture image has map objects drawn by closed-loop lines. A vector data generation device executes a digital image processing to extract map objects (object image patterns) from the digitized image and produces vector data constituted by a series of coordinate data streams that define the geometric shape of each extracted map object. The vector data of the individual extracted map objects are affixed with identification labels to specify them. Based on the vector data affixed with the identification labels, an image presentation device outputs a reference picture image at least partially including the extracted map objects affixed with the identification labels and presents it to an operator.

When the operator manually prepares a document describing the list of plural sets of attribute data to be input (these attribute data are also affixed with identification labels), by referring to the reference picture image and sets the document to an attribute data input device, this input device optically reads the document and produces an electric character data signal that represents plural sets of attribute data corresponding to the extracted map objects. An automatic data merging device is connected to the vector data generation device and the attribute data input device, and automatically merges plural sets of vector data of the extracted map objects with plural sets of attribute data through the identification labels in such a manner that one set of attribute data is combined with vector data having the same identification label as this attribute data. This increases the efficiency of the input operation for the map data base.

This invention and its objects and advantages will become more apparent as the detailed description of a preferred embodiment of this invention given later proceeds.

BRIEF DESCRIPTION OF THE DRAWINGS

In the detailed description of a preferred embodiment of the invention presented below, reference is made to the accompanying drawings in which:

FIG. 1 is a diagram showing the arrangement of the main portion of an input apparatus for a computer-aided picture data base management system according to a preferred embodiment of this invention;

FIG. 2 is a diagram illustrating a map image to be input to the map data base input apparatus of FIG. 1;

FIG. 3 is a diagram illustrating an object image printed by a hard-copy generator provided in the input apparatus of FIG. 1, with closed-loop line image patterns, representing map objects such as houses and buildings, being extracted from the original map image and each map object given with a labeling number;

DETAILED DESCRIPTION OF PREFERRED EMBODIMENT

Figure 4:
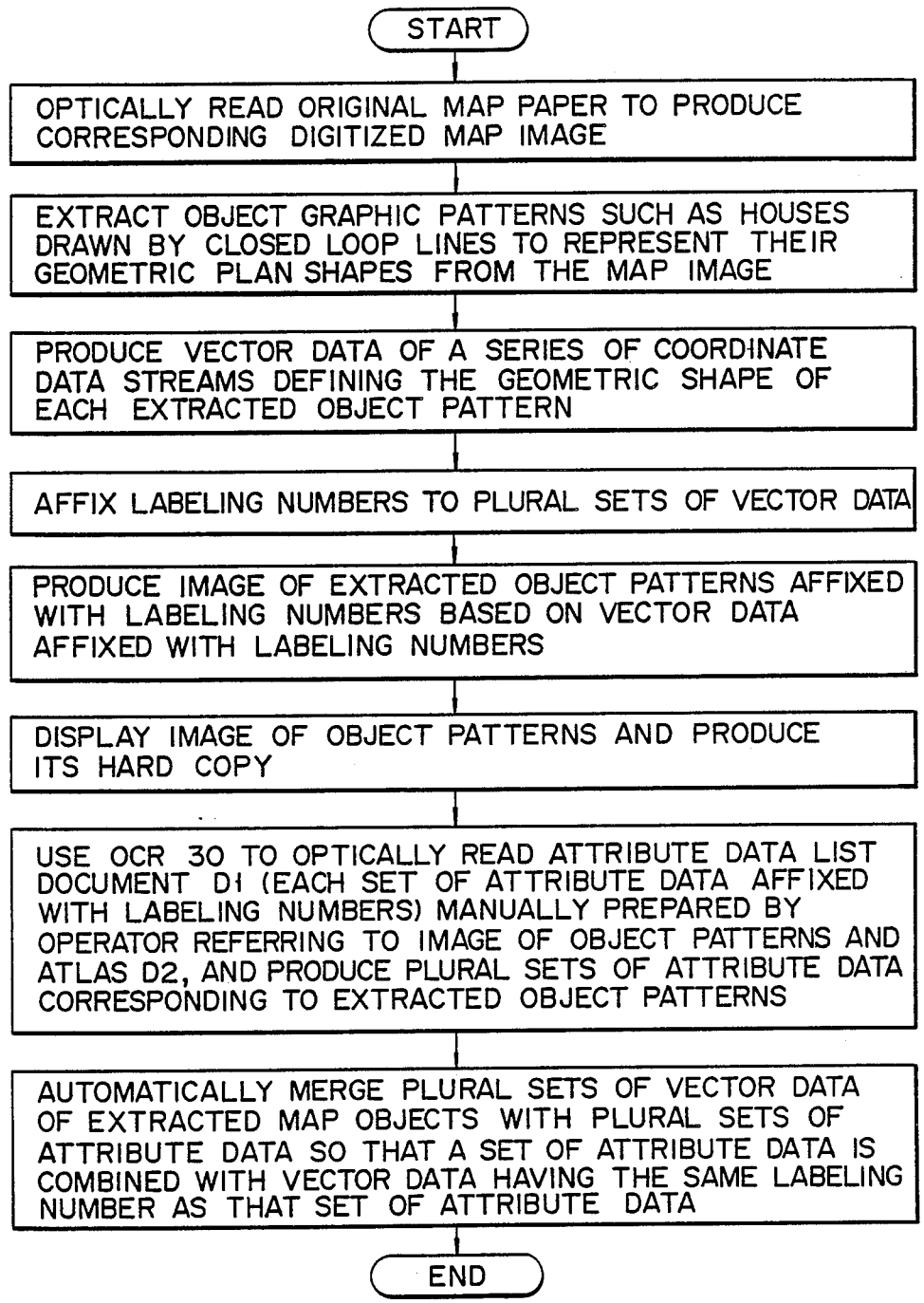
FIG. 4 is a flowchart illustrating main operation processes of the input apparatus shown in FIG. 1.

Referring now to FIG. 1, an input apparatus for a geographic or topographic map data base system has an image reading device 10, which optically reads a paper map 12 and generates its corresponding digitized map image signal 14. This image reading device 10 may be a known optical image reader.

Digitized image signal 14 is supplied to an image memory 16 for temporary storage. Image memory 16 is connected to an object image pattern extracting unit 18, which extracts closed loop lines indicating the plan shapes of map objects (also known as "object graphic patterns") such as houses and buildings, from the digitized picture image that represents the original map pattern of paper map 12, and attains vector data that consists of plural pieces of coordinate data defining the geometric shapes of each extracted map object. Object image pattern extracting unit 18 then performs a labeling operation on each vector data. For instance, numerals "1," "2," "3," . . . are affixed as identification labels to plural pieces of vector data of the extracted map objects in a predetermined order. The vector data of the extracted objects and the label data that are affixed to the vector data are stored in a data memory (not shown) of object image pattern extracting unit 18 in one-to-one corresponding relationship. The image processing and vector data calculation involving the extraction of closed-loop map objects from the original image are well known, and are disclosed, for example, in "Digital Picture Processing," by Azriel ROSENFELD & Avinash C. KAK, Academic Press, (1976), Chapter 8, pages 317 to 328.

A signal 20, which represents plural pieces of vector data affixed with their respective labeling numbers and representing the object image components (map object images) that are extracted from the digitized map image of the original map, is supplied to a display unit 22 and a hard-copy generator 24.

Display unit 22 is constituted generally by a cathode ray tube (CRT) display device and displays on its display screen the extracted map object images affixed with the respective labeling numbers. Hard-copy generator 24, which may be an image printer, provides a hard copy of these extracted map object images with the labeling numbers. An example of the hard copy corresponding to the input map 12 is denoted by reference number "26" in FIG. 1.

The output signal 20 of object image pattern extracting unit 18 is also supplied to an automatic map data generator 28, which is coupled to an optical character reader 30 (also known as "OCR" among those skilled in the art). This character reader 30 optically reads a reference document (indicated by D1 in FIG. 1), which has the attribute information of each map object with label data written thereon and is prepared in advance by an operator or a worker, and then produces an attribute data signal 32 that is supplied to automatic map data generator 28.

Upon receipt of signal 20 from object image pattern extracting unit 18 and attribute data signal 32, map data generator 28 computationally merges or combine the vector data of each map object and the attribute data, which have common label data. More specifically, the vector data of a house pattern (map object) with number "1" is combined with the attribute data with labeling number "1," thereby providing a series of data streams. A number of data streams formed by automatic map data generator 28 and represented as data samples, are stored in a data storage unit 34.

The following is a detailed description of the operation mode of the picture data base input apparatus with the above structure, with reference to a flowchart shown in FIG. 4.

In inputting original map 12 of FIG. 2 using the picture data base input apparatus of FIG. 1, the map 12 is first disposed on the reading table plate (not shown) of optical image reader 10. Optical image reader 10 in turn generates digitized image signal 14 for the input map pattern, which is temporarily stored in memory 16 and is then supplied to object image pattern extracting unit 18.

The pattern extracting unit 18 extracts only the closed loop line image patterns, which define the plan contours of the individual houses, buildings, etc. that are indicated by closed loop patterns, from the digitized map image picture, and generates coordinate vector data representing the plan shape of each map object. In extracting the line images of the map objects, therefore, noting characters (e.g., house names) affixed to the map objects and the non-looped line patterns (e.g., open-loop line patterns indicating streets) are deleted. The extracted map objects, namely, picture patterns of houses and buildings, are then converted into vector data. According to this embodiment to attain a vector representation of the plan pattern of each map object, a sequence of coordinate data consisting of the coordinates of the edges and those of the center of each map object image pattern is prepared, for instance. The coordinate data streams of the individual map objects are automatically affixed with labeling numbers in a predetermined order by object image pattern extracting unit 18, thus providing the vector data that has the structure shown in Table 1 below.

TABLE 1

| Label | Coordinate Data Of Map Objects |
|---|---|
| 1 | $(x11,y11)-(x12,y12)-\ldots-(x1n_1,y1n_1)$ |
| 2 | $(x21,y21)-(x22,y22)-\ldots-(x2n_2,y2n_2)$ |
| 3 | $(x31,y31)-(x32,y32)-\ldots-(x3n_3,y3n_3)$ |
| . | . |
| . | . |
| 7 | $(x71,y71)-(x72,y72)-\ldots-(x7n_7,y7n_7)$ |

As should be obvious from Table 1, the rectangular image pattern representing the house of Mr. Smith in FIG. 2 is affixed with labeling number "1," while the image patterns of the bakery and Mr. Tanaka's house are respectively affixed with labeling numbers "2" and "3." The labeling numbers may be assigned simply in this manner. In the above example, the map object image located at the upper left on the displayed image is labeled "1," with the remaining labeling numbers "2," "3," . . . and "8" assigned with a fixed order. FIG. 3 illustrates an example of an image that shows the arrangement of the extracted map objects thus assigned with labeling numbers. The output signal 20 of unit 18 that computationally represents this picture image is supplied to display unit 22, hard-copy generator 24 and automatic map data generator 28, as mentioned earlier. The operator or worker can easily confirm the correlation between the houses or buildings and the labeling numbers by viewing the picture image of the extracted map objects with labeling numbers on display unit 22 and/or referring to hard copy 26 of the picture image printed by hard-copy generator 24.

Referring to picture image 26 having the map objects printed thereon, the inputting of attribute data (e.g., house names, addresses, telephone numbers, occupations) can be executed easily and efficiently. The attribute data is given in advance on reference documents D2 such as an atlas, a ledger, etc. Referring to the documents D2 and the hard copy 26, the operator manually prepares document D1 which shows a list of the map objects and their associated attribute data that needs to be input. (In FIG. 1, the operator's actions to refer to reference documents D2 and hard copy 26 are indicated by the broken-line arrows for visual confirmation.) An example of document D1 is given in Table 2 below.

TABLE 2

| Label | Attribute Data Of Map Objects | | |
|---|---|---|---|
| | Name | Telephone No. | Note |
| 1 | Smith | 044(511)2111 | |
| 2 | Satoh | 044(548)1234 | Bakery |
| 3 | Tanaka | 044(511)5678 | |
| . | . | . | |
| . | . | . | |
| . | . | . | |
| 7 | Apartment | 044(548)4444 | Owned by Suzuki |

Document D1 with the above data list is optically scanned by optical character reader 30 and is converted into electric attribute data signal 32. The attribute data signal 32 is supplied to automatic map data generator 28 where the signal is automatically merged in one-to-one correspondence with the output signal of object image pattern extracting unit 18, i.e., the vector data of the map objects with labeling numbers that have the structure given in Table 1. More specifically, one of the vector data of the labeled map objects (see Table 1) is merged with that one of the labeled attribute data (see Table 2) which has a common labeling number with that vector data so as to form a new data stream. For instance, the vector data stream having labeling number "1" (which indicates the object image pattern of Mr. Smith's house in FIG. 2) is merged with a set of attribute data having the same labeling number "1." This merging (also referred to as "synthesizing" is performed on plural sets of vector data and plural sets of attribute data which other labeling numbers. This yields map data consisting of merged data streams shown in Table 3 below.

The map data having the structure given in the above Table 3 is stored in data storage unit 34. As should be obvious from Table 3, one set of attribute data is coupled to the vector data stream of the associated map object through the common labeling number, so that each attribute data to be input can be displayed on the display screen at the proper position of the corresponding map object image pattern to overlie thereon on the finally formed map.

The map data base system input apparatus of this invention has the following technical advantages.

First, the input operation of a vast amount of attribute data constructing a map data base, which is manually done by an operator or worker by the conventional technique using the pointing device and keyboard, can be simplified so that the efficiency of the data base inputting operation is considerably improved. This is because each input attribute data is automatically and properly merged with the vector data of its associated map object pattern by the automatic map data generator. Consequently, at the time of inputting attribute data streams, the operator need not to designate where to input on the displayed map using the pointing device, and what is more, the attribute data input itself is executed at a high speed using the optical character reader. Accordingly, the manual operation necessary to build the map data base is simplified and its speed is increased, thus improving the operational efficiency.

Secondly, the input operation of attribute data using optical character reader 30 can be done in parallel by more than one operator or worker, so that the input operation for a map data base with an extended region can be efficiently conducted in a relatively short time. Image 26 indicating the map objects such as houses, buildings and parks, extracted from the original map image and given with labeling numbers, is output as a printed image from hard-copy generator 24. With copies of image 26 provided and distributed to a plurality of operators, the preparation of the attribute data list shown in Table 2 can be assigned to the operators. For instance, one operator may deal with the list preparation of the attribute data for the first four of the map objects labeled "1" to "7" in FIG. 3, while another operator may deal with the list preparation of the attribute data for the last three map objects (i.e., those labeled "5" to "7"). This shortens the time for preparing attribute data list document D1 by half.

Although the invention has been described with reference to a specific embodiment, it shall be understood by those skilled in the art that numerous modifications may be made within the spirit and scope of the inventive contribution.

For instance, in the case where the map image to be input is dense and includes a number of map objects in a single image screen (e.g., more than 100), the above-described embodiment may be modified such that a single map image 50 can be divided into a plurality of

TABLE 3

Figure 5:
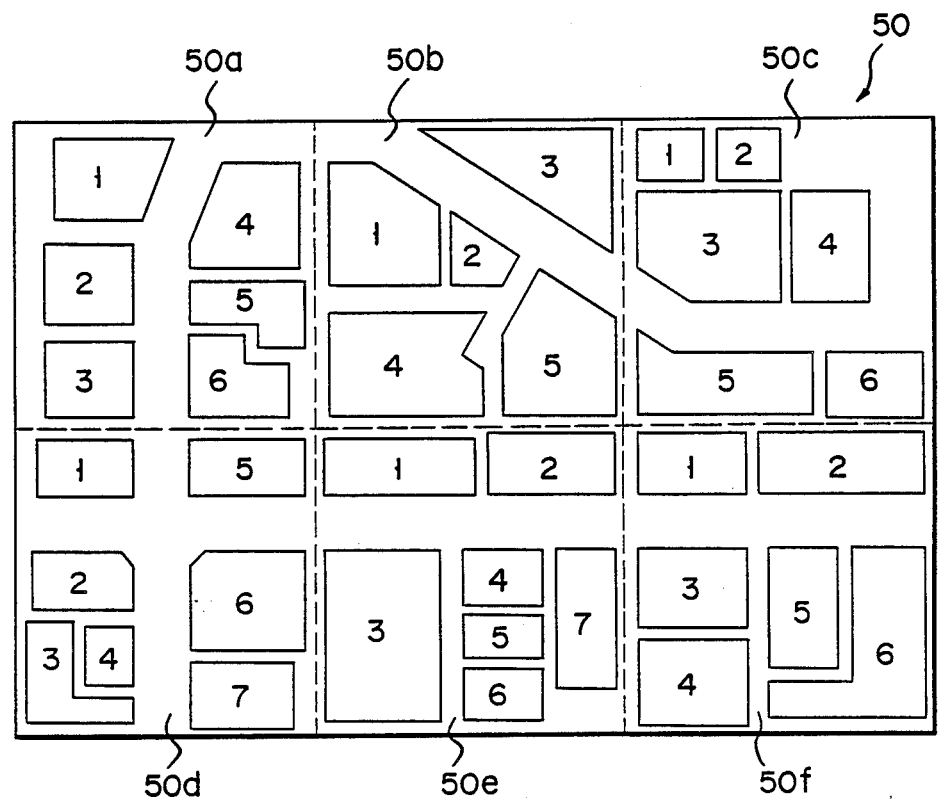
FIG. 5 is a diagram showing an another example of a map image to be input to the input apparatus of FIG. 1, which is separated into several image regions each including a reasonable number of objects.

| Label | Coordinate Data of Map Objects | Attribute Data of Map Objects | | |
|---|---|---|---|---|
| | | Name | Telephone No. | Note |
| 1 | (x11,y11)-(x12,y12)-....-(x1n$_1$,y1n$_1$) | Smith | 044(511)2111 | |
| 2 | (x21,y21)-(x22,y22)-....-(x2n$_2$,y2n$_2$) | Satoh | 044(548)1234 | Bakery |
| 3 | (x31,y31)-(x32,y32)-....-(x3n$_3$,y3n$_3$) | Tanaka | 044(511)5678 | |
| . | . | . | . | |
| . | . | . | . | |
| . | . | . | . | |
| 7 | (x71,y71)-(x72,y72)-....-(x7n$_7$,y7n$_7$) | Apartment | 044(548)4444 | Owned by Suzuki | image sections 50a, 50b, 50c, 50d, 50e and 50f (for example, n×m sections) as shown in FIG. 5. The number of the divided image sections is determined such that each section includes closed-loop image patterns representing a reasonable number of map objects. The labeling numbers are assigned for each image section in the order of "1," "2," "3," ... in accordance with the aforementioned rule. In this case, if region numbers are affixed to the individual image sections 50a to 50f, the map image of the desired region can be easily designated.

According to the above embodiment, an optical character reader is used to enter attribute data; however, this data can be input on-line via a terminal. Further, a digitizer may replace the image reading device to input vector data. Furthermore, the objects to be labeled are not limited to map objects; for instance, the labeling can apply to various fields including the element symbols in a circuit diagram.

What is claimed is:

1. A picture data base input apparatus comprising:
   (a) image input means for optically reading an original picture image having picture objects drawn by closed loop lines, and producing an electrical image signal representing a corresponding digitized image;
   (b) vector data generation means, connected to said image input means, for receiving said image signal, for executing a digital image processing to extract said picture objects from said digitized image, for producing vector data constituted by a series of coordinate data streams that define a geometric shape of each extracted object, and for affixing said vector data with an identification label to specify said vector data;
   (c) image presentation means for outputting a reference image at least partially including said extracted objects affixed with identification labels, based on said vector data affixed with said identification label;
   (d) attribute data input means for optically reading an attribute data list document prepared by referring to said reference image and for producing an electrical character data signal representing plural sets of attribute data corresponding to said extracted objects, each of said plural sets of attribute data being affixed with said identification label referring to said reference picture image; and
   (e) automatic data merging means, connected to said vector data generation means and said attribute data input means, for automatically merging said plural sets of vector data of said extracted picture objects with said plural sets of attribute data through said identification labels in such a manner that one set of attribute data is combined with vector data having the same identification label as said one set of attribute data, thereby building a picture data base.

2. The apparatus according to claim 1, wherein said image presentation means includes display means for displaying said reference image on a display screen.

3. The apparatus according to claim 1, wherein said image presentation means includes hard-copy generating means for providing a hard copy representing said reference image, thereby permitting an operator to manually prepare said attribute data list document referring to said hard copy.

4. The apparatus according to claim 3, wherein said attribute data input means includes optical character reader means to optically read said hard copy.

5. The apparatus according to claim 4, further comprising:
   (f) image memory means, connected to said image input means and said vector data generation means, for receiving said image signal from said image input means and storing said digitized image.

6. The apparatus according to claim 5, further comprising:
   (g) data storage means, coupled to said automatic data merging means, for storing said plural sets of vector data of said extracted objects and said plural sets of attribute data, which are merged through said identification labels.

7. The apparatus according to claim 3, wherein said image input means divides said digitized image into a plurality of image sections and supplies an electrical image signal representing each of said divided image sections to said vector data generation means, and wherein said vector data generation means extracts objects included in each of said divided image sections, produces vector data for said extracted objects and affixes an identification label to said vector data to specify said vector data.

8. A picture data base input method comprising the steps of:
   (a) optically reading an original picture image having picture objects drawn by closed loop lines, to produce an electrical image signal representing a corresponding digitized image;
   (b) receiving said image signal to execute a digital image processing to extract said objects from said digitized image;
   (c) producing vector data constituted by a series of coordinate data streams that define a geometric shape of each extracted object;
   (d) affixing said vector data with an identification label to specify said vector data;
   (e) outputting a reference picture image at least partially including said extracted objects affixed with identification labels, based on said vector data affixed with said identification label;
   (f) optically reading an attribute data list document manually prepared by referring to said reference image and producing an electrical character data signal representing plural sets of attribute data corresponding to said extracted objects, each of said plural sets of attribute data being affixed with said identification label referring to said reference image; and
   (g) automatically merging said plural sets of vector data of said extracted objects with said plural sets of attribute data through said identification labels in such a manner that one set of attribute data is merged with vector data having the same identification label as said one set of attribute data, thereby building a picture data base.

9. The method according to claim 8, wherein said reference image is displayed on a display screen of a display device.

10. The method according to claim 8, wherein said reference image is printed as a hard copy, thereby permitting an operator to manually prepare said attribute data list document referring to said hard copy.

11. The method according to claim 8, wherein said digitize image is temporarily stored in an image memory.

12. The method according to claim 8, wherein said plural sets of vector data of said extracted objects and said plural sets of attribute data, which are merged through said identification labels, are stored in a data storage device.

13. The method according to claim 8, wherein said digitized image is divided into a plurality of image sections, picture objects included in each of said divided image sections are extracted, and vector data for said extracted objects are produced and affixed with identification labels.

14. The method according to claim 13, wherein said identification labels consist of a series of numbers increasing in a simple manner.

* * * * *